(12) United States Patent
Thekkeettil et al.

(10) Patent No.: US 12,259,747 B1
(45) Date of Patent: Mar. 25, 2025

(54) CLOCK MONITORING USING POINTER TECHNIQUES

(71) Applicant: Marvell Asia Pte Ltd, Singapore (SG)

(72) Inventors: Madhusudhan Harigovindan Thekkeettil, Cupertino, CA (US); Josef Mueller, San Jose, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 112 days.

(21) Appl. No.: 18/159,451

(22) Filed: Jan. 25, 2023

Related U.S. Application Data

(60) Provisional application No. 63/302,943, filed on Jan. 25, 2022.

(51) Int. Cl.
*G06F 1/12* (2006.01)
*H04L 5/00* (2006.01)
*H04L 7/00* (2006.01)

(52) U.S. Cl.
CPC ..................................... *G06F 1/12* (2013.01)

(58) Field of Classification Search
CPC ....................................................... G06F 1/12
See application file for complete search history.

(56) References Cited

U.S. PATENT DOCUMENTS

| | | | | |
|---|---|---|---|---|
| 7,469,328 | B1 * | 12/2008 | Mak | G06F 13/1689 711/159 |
| 10,168,989 | B1 * | 1/2019 | Shou | G06F 5/065 |
| 11,361,795 | B2 * | 6/2022 | Keating | H04L 7/0029 |
| 2003/0149907 | A1 * | 8/2003 | Singh | H03L 7/00 713/500 |
| 2003/0212930 | A1 * | 11/2003 | Aung | G11C 7/22 714/700 |
| 2008/0288805 | A1 * | 11/2008 | Osborn | G06F 5/06 713/400 |
| 2022/0045777 | A1 * | 2/2022 | Amicangioli | H04J 3/0667 |
| 2023/0216653 | A1 * | 7/2023 | Tachibana | H04L 7/033 375/357 |

* cited by examiner

*Primary Examiner* — Xuxing Chen (57) ABSTRACT

Two pointers are initialized. The first pointer is incremented every M cycles of a monitored clock and the second pointer is incremented every N cycles of a reference clock, where M and N are determined from a frequency relationship between the clocks. If the positions of the pointers are determined to differ by more than a drift threshold, an error is detected and corrective action may be taken.

21 Claims, 6 Drawing Sheets

CLOCK MONITORING USING POINTER TECHNIQUES

CROSS REFERENCE TO RELATED APPLICATION

This disclosure claims the benefit of, commonly-assigned U.S. Provisional Patent Application No. 63/302,943, filed Jan. 25, 2022, which is hereby incorporated by reference herein in its entirety.

FIELD OF USE

This disclosure relates to clock monitoring systems. More particularly, this disclosure relates to a method and apparatus for monitoring the drift of two clocks relative to one another, and especially to check a monitored clock against a reference clock.

BACKGROUND

The background description provided herein is for the purpose of generally presenting the context of the disclosure. Work of the inventors hereof, to the extent that that work is described in this background section, as well as aspects of the description that may not otherwise qualify as prior art at the time of filing, are neither expressly nor impliedly admitted to be prior art against the subject matter of the present disclosure.

In a variety of applications, such as automotive networks, systems contain networks which rely on a continuous clock. In complex systems with multiple independent subsystems, a circuit malfunction in a subsystem may disrupt the clock before the clock is able to reach the rest of the network. Therefore, this clock must be reliable because disruption of the operation of network clocking may lead to various malfunctions.

SUMMARY

There is a need for a method of detecting a clock error of a monitored clock in an automotive network. One method for detecting a clock error of the monitored clock is to receive clocking signals from a reference clock, wherein the frequency relationship between the monitored clock and reference clock is known. Two pointers are initialized. The first pointer is incremented at every M of the monitored clock and the second pointer is incremented at every N of the reference clock. The positions of the pointers are then compared. If the positions differ by more than a threshold amount of drift between the two clocks, a clock error is indicated and corrective action is taken.

In some implementations, the corrective action may comprise clocking the automotive network using the reference clock. In some implementations, the corrective action may comprise resetting the monitored clock.

In some implementations the frequency relationship is a rational relationship M/N. In some implementations the frequency relationship is an irrational number which is then approximated by a rational relationship M/N. In some implementations, the frequency relationship is a rational fraction P/Q wherein at least one of P and Q is greater than an integer threshold which is then approximated by a rational fraction M/N wherein each of M and N is less than the integer threshold.

In some implementations, it may be determined that at least one of the first pointer and the second pointer has moved more than a predetermined excursion from its initial position, wherein the predetermined excursion is less than the drift threshold. The pointers are then reinitialized.

In some implementations, the amount of clock drift may be determined when the pointers are compared. In further implementations, indicating the clock error may include indicating the amount of clock error.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

The subject of this disclosure is to determine a clock error and take corrective action in an automotive network. The network contains a clock which clocks the network, and which is monitored in accordance with implementations of the subject matter of this disclosure. This monitored clock must provide a reliable clock to the network, and therefore must be monitored for any errors. In some implementations this clock is generated from an analogue electronic circuit. In some implementations, the monitored clock maybe generated by a voltage-controlled oscillator of a phase-locked loop. The method described also uses a reference clock, which is a precise clock with low variability which can be used to check other clocks in the system. This reference clock is not connected to circuitry in the network which is subject to variability. The reference clock is generated independently from the circuits of the network and therefore does not experience the variations generated from the network. In some implementations, generating the reference clock may involve a high frequency voltage-controlled oscillator circuit. In other implementations, the reference clock may be generated by a crystal oscillator. In order to determine a clock error has occurred and take corrective action, the frequency of the monitored clock of the network is compared to the reference clock.

The monitored clock and reference clock may have a frequency relationship M: N, where M is the number of cycles the monitored clock completes for every N cycles of the reference clock. The frequency relationship between the monitored clock and the reference clock is used to increment the positions of the pointers. Thus, in this implementation, first pointer may be incremented at every M cycles of the monitored clock while the second pointer may be incremented at every N cycles of the reference clock. In some implementations, the frequency relationship may be rational. For example, the frequency relationship may be 3:2. Therefore, the monitored clock cycles at a rate of three cycles to every two cycles of the reference clock. In some implementations, the frequency relationship may be irrational and must be approximated by a rational relationship. For example, the frequency relationship may be π:1, which could be approximated by 22/7.

In some implementations, the frequency relationship may be rational but with either a numerator or denominator larger than an integer threshold. In this implementation, the clock drift can still be determined in accordance with the subject matter of this disclosure, but it could take many clock cycles for the drift to be apparent when there is large difference in the relative number of cycles. Therefore, the frequency relationship may be approximated by another rational relationship with smaller values in the numerator and/or denominator. For example, the frequency relationship may be 803/500 with an integer threshold of 25 for the values of the numerator or denominator. Insofar as both the numerator and denominator are over that integer threshold, the frequency relationship may be approximated by 8/5. Approximating frequency relationships that have large numerators or denominators in this way (i.e., with a smaller numerator or denominator) makes a drift apparent sooner. On the other hand, approximating the frequency relationship with smaller numerator or denominator values may raise the minimum detectable drift.

Similar considerations may be taken into account in approximating an irrational frequency relationship. For example, in the case of a ratio of π:1 as discussed above, a more accurate rational approximation might be 333/106. However, in such an approximation, both the numerator and denominator are larger than the integer threshold of 25, meaning it would take to many cycles for drift between the clocks to be observable. Therefore, the less accurate rational approximation of 22/7 may be used.

Two pointers corresponding to the monitored and reference clocks are initialized. In some implementations, the pointers may be initialized to an initial common position (e.g., to corresponding locations in two parallel linear shift registers used to store the pointer values). In some implementations, the pointers may be initialized to different positions. The pointers are incremented according to their respective clock frequencies as described above. The positions of the pointers are then compared over time. In some implementations, the comparison may occur asynchronously from the incrementing of the pointers. That is, the comparison does not need to occur as the pointers are incremented, but rather whenever the node is configured to compare the positions. If the clocks are precise, with no drift, the pointers should advance at the same rate. If the pointers do not advance at the same rate, there is clock drift in the system. In implementations where the pointers were initialized to corresponding positions, the drift threshold—i.e., the tolerated threshold amount of clock drift—is defined as an allowed difference between the positions of the two pointers. In implementations where the pointers were initialized to different positions, the drift threshold is the sum of the difference between the initial positions of the pointers and an allowed difference between the positions of the two pointers. The system may be configured to tolerate a threshold amount of clock drift. In some implementations, the node may take corrective action to correct the clock error. This corrective action may include clocking the network using a different clock (which may be the reference clock) or resetting the monitored clock.

In some situations, because of variation between the clocks, the pointers may eventually drift apart even in the absence of a clock failure. In implementations where the frequency relationship is irrational, or where the relationship is rational but is nevertheless approximated, the pointers will experience additional drift, because they will move based on the rational approximation rather than according to their actual relationship. In order to avoid a false detection of a clock failure due to drift, the node periodically re-initializes the two pointers to the initial common position.

The positions to which the pointers are initialized may be those positions which allow the maximum range of detectable clock deviation in both directions. In some implementations, the initialized state to which the pointers are set is the position in which the difference between pointers equals half of the register size or storage device size. This value or position of the initialized state may be used in the first initialization process when the method according to the subject matter of this disclosure begins operation, as well as for reinitialization. Reinitialization may occur either because of drift between the positions of the pointers or because of reaching the end of the storage device used to store the pointers (e.g., a shift register), which may occur even without drift.

The subject matter of this disclosure may be better understood by reference to FIGS. 1-8.

Figure 1:
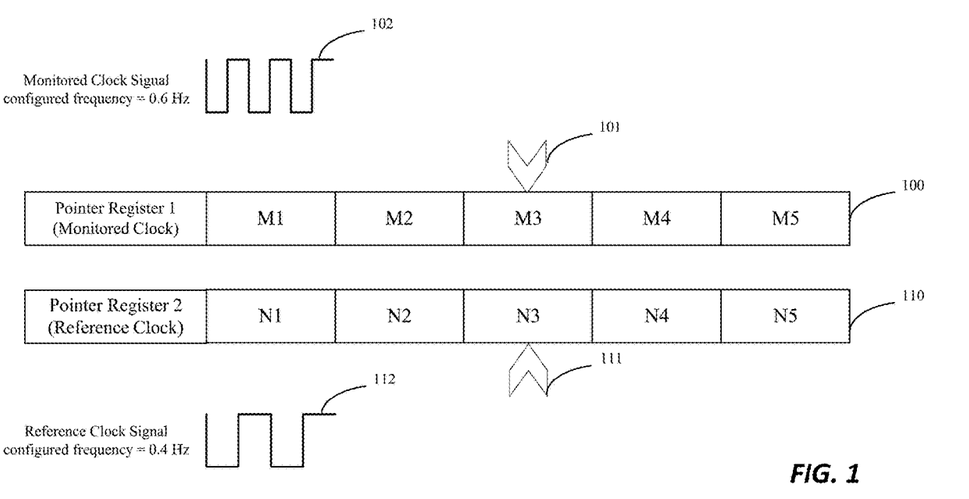
FIG. 1 is an illustration of a situation in which monitored clock and reference clock are functioning properly and a monitored clock pointer and a reference clock pointer are located at initial identical positions at a first time.
Figure 2:
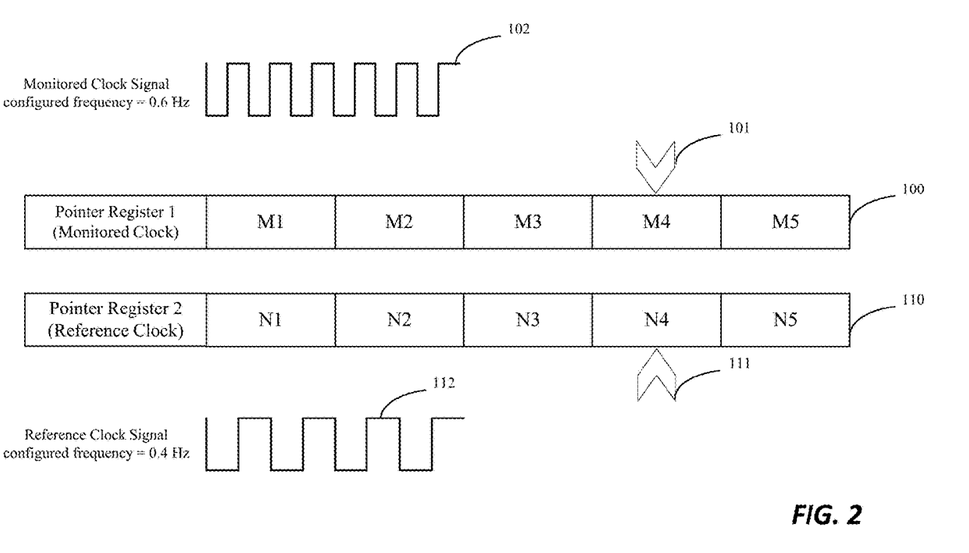
FIG. 2 is an illustration of a situation in which the monitored clock and reference clock are functioning properly and a monitored clock pointer and the reference clock pointer are located at other identical positions at a second time.

As shown in FIGS. 1 and 2, a pointer 101 representing a monitored clock and a pointer 111 representing a reference clock may be initialized to the same initial position at a first time (FIG. 1). In the situation shown in FIGS. 1 and 2, pointer 101 had been initialized to position M2 and pointer 111 had been initialized to corresponding position N2. At a first time, represented in FIG. 1, the monitored clock 102, which has been configured to have a frequency of 0.6 Hz, represented by pointer 101 has run for three cycles. The reference clock 112, which has been configured to have a frequency of 0.4 Hz, represented by pointer 111 has run for two cycles. The frequency relationship of the monitored clock to the reference clock, defined by the frequencies at which the clocks are configured to run, is 0.6 Hz/0.4 Hz=3/2.

For every M=3 cycles of monitored clock 102, pointer 101 is incremented by one position in pointer register 100. Here, monitored clock 102 has completed three cycles and pointer 101 has moved one position from the initial position M2 to position M3. Similarly, for every N=2 cycles of reference clock 112, pointer 111 is incremented by one position in pointer register 100. Here, reference clock 112 has completed two cycles and pointer 111 has moved one position from the initial position N2 to position N3. The positions of monitored clock pointer 101 and reference clock pointer 111 are the same, indicating that there has not been any drift between monitored clock 102 and reference clock 112.

At a second time, represented in FIG. 2, monitored clock 102 has now run for 6 cycles, while reference clock 112 has run for four cycles. Because monitored clock signal 102 has completed six cycles—i.e., an additional M cycles relative to FIG. 1—pointer 101 has moved one additional position and is now located at position M4. Similarly, because reference clock signal 112 has completed four cycles—i.e., an additional N cycles relative to FIG. 1—pointer 111 has moved one additional position and is now located at position N4. The positions of monitored clock pointer 101 and reference clock pointer 111 remain equal, indicating that there still has not been any drift between monitored clock 102 and reference clock 112.

Figure 3:
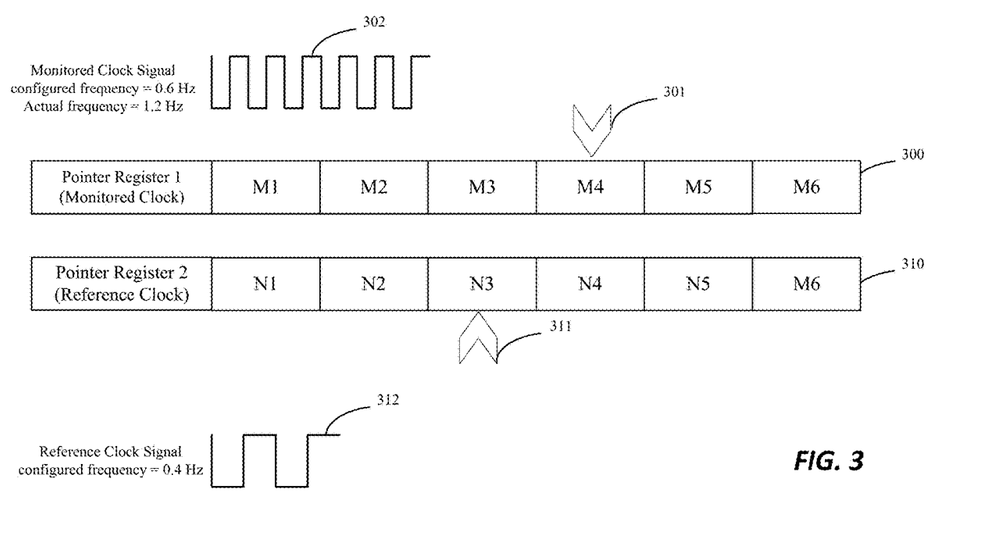
FIG. 3 is an illustration of a situation in which the monitored clock drifts because it is not functioning properly, and the monitored clock pointer and the reference clock pointer are located at different positions at a first time.
Figure 4:
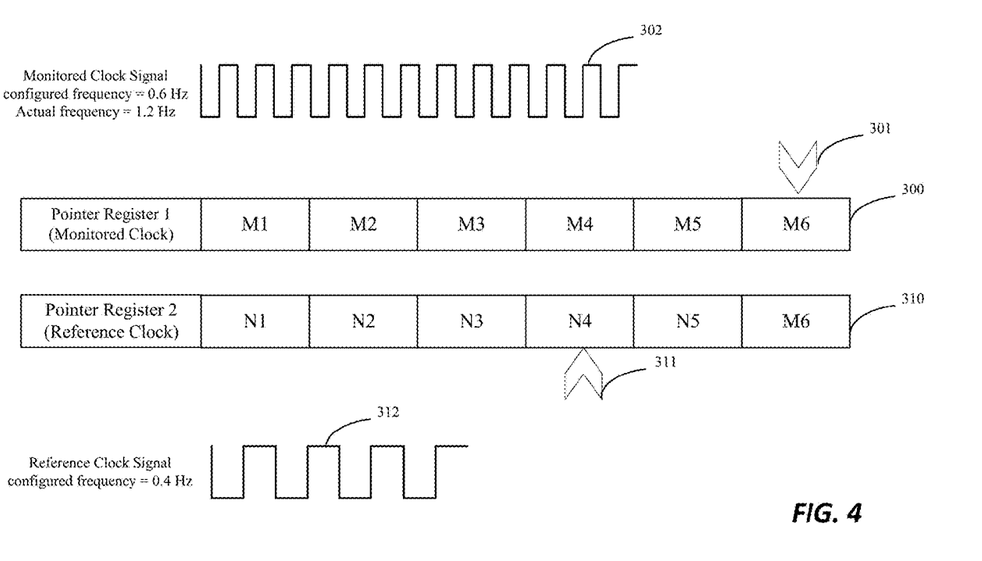
FIG. 4 is an illustration of a situation in which the monitored clock drifts because it is not functioning properly, and the monitored clock pointer and the reference clock pointer are located at different positions at a second time.

As shown in FIGS. 3 and 4, representing a situation in which the monitored clock is not functioning properly and therefore will drift, a pointer 301 representing the monitored clock and a pointer 311 representing a reference clock may be initialized to the same initial position at a first time (FIG. 3). In the situation shown in FIGS. 3 and 4, pointer 301 had been initialized to position M2 and pointer 311 had been initialized to corresponding position N2. At a first time, represented in FIG. 3, the monitored clock 302, which has been configured to have a frequency of 0.6 Hz, represented by pointer 301, has run for six cycles. The reference clock 312, which has been configured to have a frequency of 0.4 Hz, represented by pointer 311, has run for two cycles. The frequency relationship of the monitored clock to the reference clock, defined by the frequencies at which the clocks are configured to run, is 0.6 Hz/0.4 Hz=3/2. However, as discussed below in the next four paragraphs, the monitored clock has been incorrectly running at a frequency of 1.2 Hz.

For every M=3 cycles of monitored clock 302, pointer 301 is incremented by one position in pointer register 300. Here, monitored clock 302 has completed six cycles causing pointer 301 to moved two positions from the initial position M2 to position M4. Similarly, for every N=2 cycles of reference clock 312, pointer 311 is incremented by one position in pointer register 300. Here, reference clock 312 has completed two cycles causing pointer 311 to moved one position from the initial position N2 to position N3. From the frequency relationship, we would have expected both pointer 301 and pointer 311 to move one position each. The fact that instead, pointer 301 moved two positions, while pointer 311 moved only one position, indicates that the monitored clock is not functioning properly. The difference in positions of clock pointer 301 and clock pointer 311 indicates that there has been drift between monitored clock 302 and reference clock 312.

In some implementations, the system may interpret any drift as an indication of a clock failure and take corrective action. In these implementations, the system would determine the difference in positions between pointer 301 and 311 as an indication of a clock error. In other implementations, there may be a threshold amount of drift which is deemed acceptable. If the acceptable threshold amount of drift between pointer 301 and pointer 311 is two positions, then no error would be detected at the first time represented in FIG. 3 since the drift demonstrated is one position. Therefore, the clocks would continue to run to the second time represented in FIG. 4.

At the second time, represented in FIG. 4, monitored clock signal 302 has now run for twelve cycles, while reference clock 312 has run for four cycles. Because monitored clock signal 302 has completed twelve cycles—i.e., an additional 2M cycles relative to FIG. 3—pointer 301 has moved two additional positions and is now located at position M6. Similarly, because reference clock signal 312 has completed four cycles—i.e., an additional N cycles relative to FIG. 3—pointer 311 has moved one additional position and is now located at position N4. From the frequency relationship, we would have expected both pointer 301 and pointer 311 to move one position each. The fact that instead, pointer 301 moved an additional two positions, while pointer 311 moved only an additional one position, indicates that the monitored clock is not functioning properly. The difference in positions of monitored clock pointer 301 and reference clock pointer 311 indicates that there has been drift between monitored clock 302 and reference clock 312.

If the acceptable threshold amount of drift for the pointers in FIG. 3 and FIG. 4 is two positions, then an error would be detected at the second time represented in FIG. 4. Therefore, the system will indicate a clock error and take corrective action.

In some implementations, the circuit may be able to tolerate a slow drift between the monitored clock and reference clock. Approximations for the frequency relationship may also cause drift, even if the clocks themselves are functioning correctly. For example, in the case where the method uses M/N as an approximation for an irrational relationship, or for a rational relationship P/Q where either P or Q is larger than an integer threshold, there will be a slow drift. In these instances, after a long period of time, the system will detect a drift and indicate a clock error. To avoid causing a false clock error indication, the pointer positions may be reinitialized at regular intervals before pointer drift reaches the drift threshold.

Figure 5:
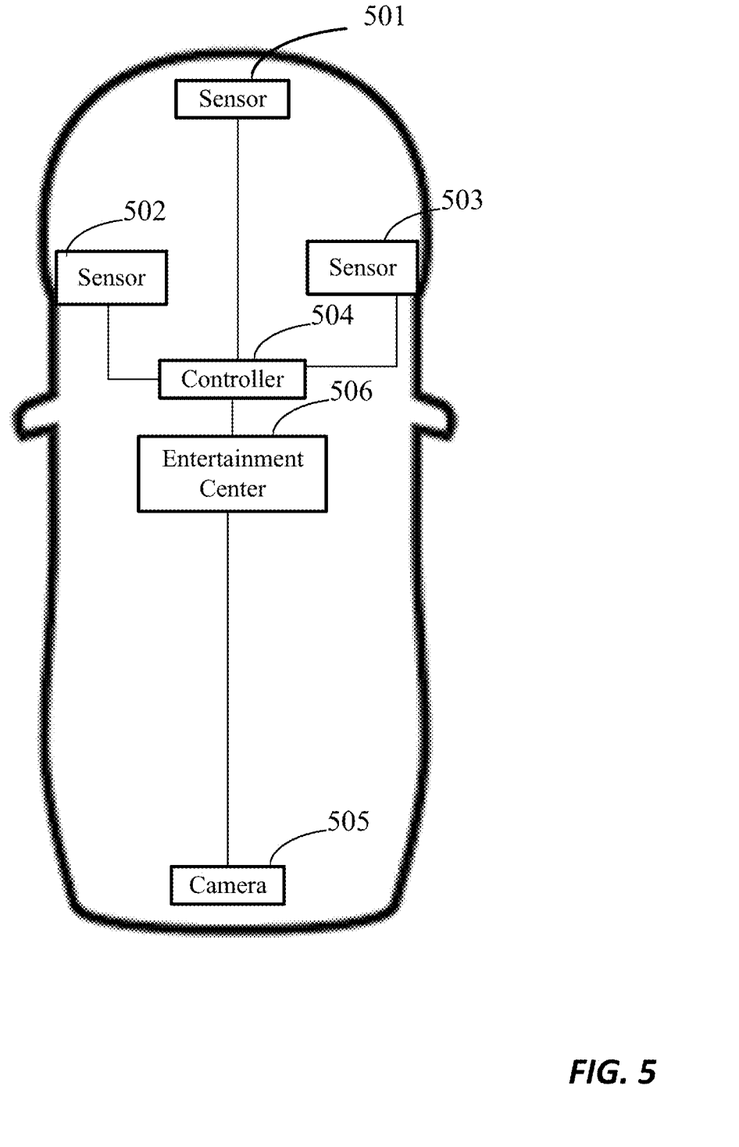
FIG. 5 illustrates multiple nodes in an automotive network in which a method according subject matter of this disclosure, for mitigating clock malfunction, may be implemented.

FIG. 5 is a block diagram illustrating an environment (e.g., an automotive network), in which the subject matter of the present disclosure may be implemented in various nodes. As seen in FIG. 5, the network may be automotive network 500 in which nodes 501, 502, and 503 are sensors, 504 is a controller, 505 is a camera, and 506 is an entertainment center. In some embodiments, sensors 501, 502, and 503 may be LIDAR, Radar, proximity sensors, temperature sensors, or auditory sensors. Other possible nodes in this system may be circuitry for implementing a backup camera, forward facing camera, display in the car, other cameras or detection systems, engine controller, steering systems, computational systems, or braking systems. It is important, particularly, in an automotive environment, that clocks remain active and accurate, to allow real-time response to driver inputs. For example, maintaining synchrony to create multi-dimensional images is important for autonomous driving. Nodes 501, 502, 503, 504, 505, and 506 may each be configured with the components described below in FIG. 6.

Figure 6:
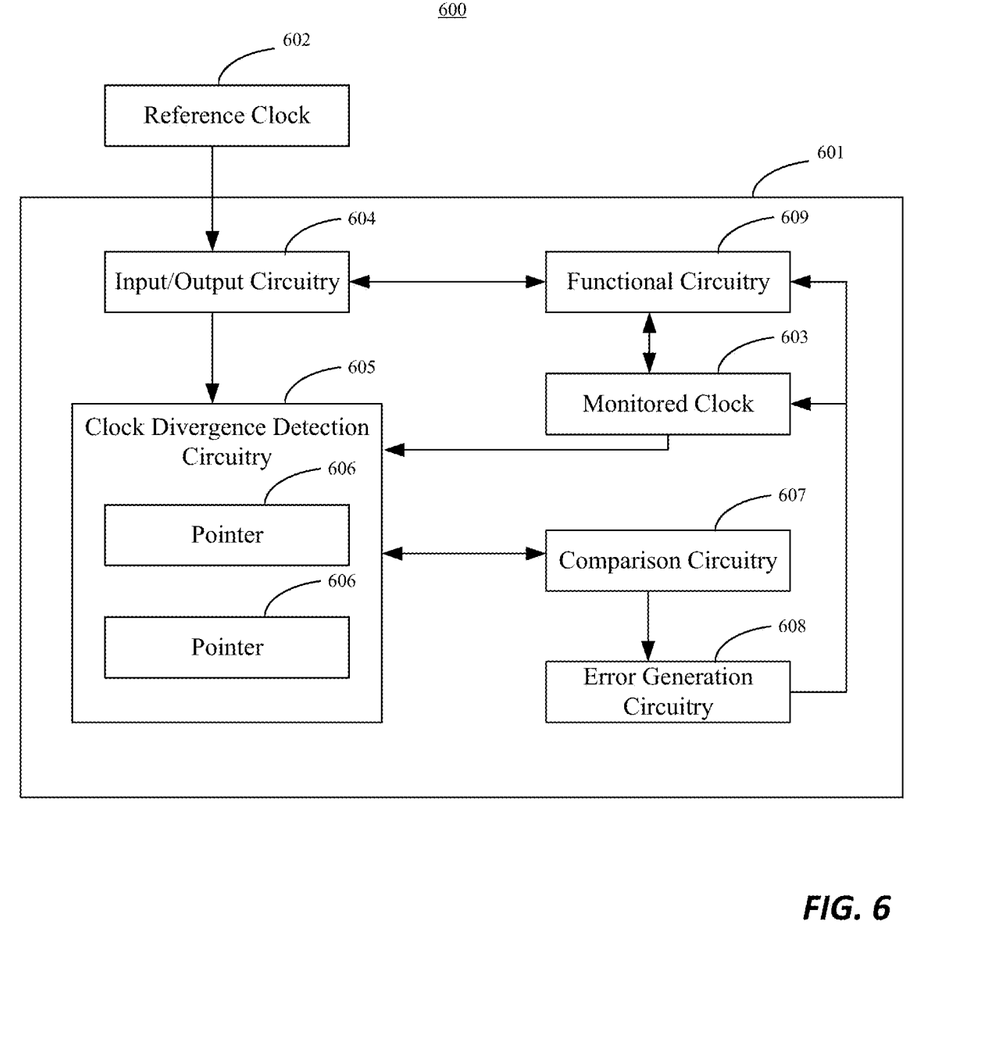
FIG. 6 is a block diagram illustrating components of a network node that is configured to implement a method for mitigating clock malfunction according to implementations of the subject matter of this disclosure.

FIG. 6 is a block diagram illustrating components, and data flow therebetween, of a node in a network that is configured to implement a method for mitigating clock malfunction according to some implementations of the subject matter of this disclosure. Node 600 contains reference clock 602 and circuitry 601 configured to implement the method of this disclosure. Input/output circuitry 604 receives clocking signals from reference clock 602. Node 601 also contains functional circuitry 609 which is clocked by monitored clock 603. In some implementations, functional circuitry 609 may be devices in an automotive network. For example, as discussed above in connection with FIG. 5, functional circuitry may be circuitry for a camera, display in the car, or braking systems.

Clock divergence detection circuitry 605 generates and increments pointers 606. Clock divergence detection circuitry 605 receives clocking signals from reference clock 602 through input/output circuitry 604 and from monitored clock 603. These clocking signals and the known frequency relationship can be used by clock divergence detection circuitry 605 to increment pointers 606. For example clock divergence detection circuitry 605 may include a modulo-M counter and a modulo-N counter each of which provides one output for every M or N clock cycle inputs, respectively, with respective pointers 606 being incremented by the output of the respective counter.

Comparison circuitry 607 compares the pointers generated and maintained by clock divergence detection circuitry 605 in accordance with methods described in connection with FIGS. 1-4 above, and FIGS. 7 and 8 below. In addition, comparison circuitry 607 may detect that pointers 606 require reinitialization by determining that at least one of pointers 606 has deviated from its initialized position more than a predetermined excursion, but the difference in position between the two pointers is less than the predetermined allowed drift threshold. The predetermined excursion must be less than the predetermined allowed drift threshold, or amount of difference between the positions of pointers 606. Comparison circuitry 607 may then notify the clock divergence detection circuitry 605 that pointers 606 require reinitialization.

If pointers 606 deviate more than the predetermined allowed drift threshold, comparison circuitry 607 notifies error generation circuitry 608 of the deviation so that error generation circuitry 608 may generate a clock error. Error generation circuitry 608 also may take corrective action. In some implementations, corrective action may include transmitting a reset signal to monitored clock 603. In other implementations, corrective action may include transmitting to functional circuitry 609 a signal to use reference clock 602, or another alternate clock source (if present), instead of monitored clock 603. These actions may be combined in still further implementations in which the functional circuitry uses the reference clock or another alternate clock while the monitored clock is being reset, after which the functional clock switches back to the monitored clock.

Figure 7:
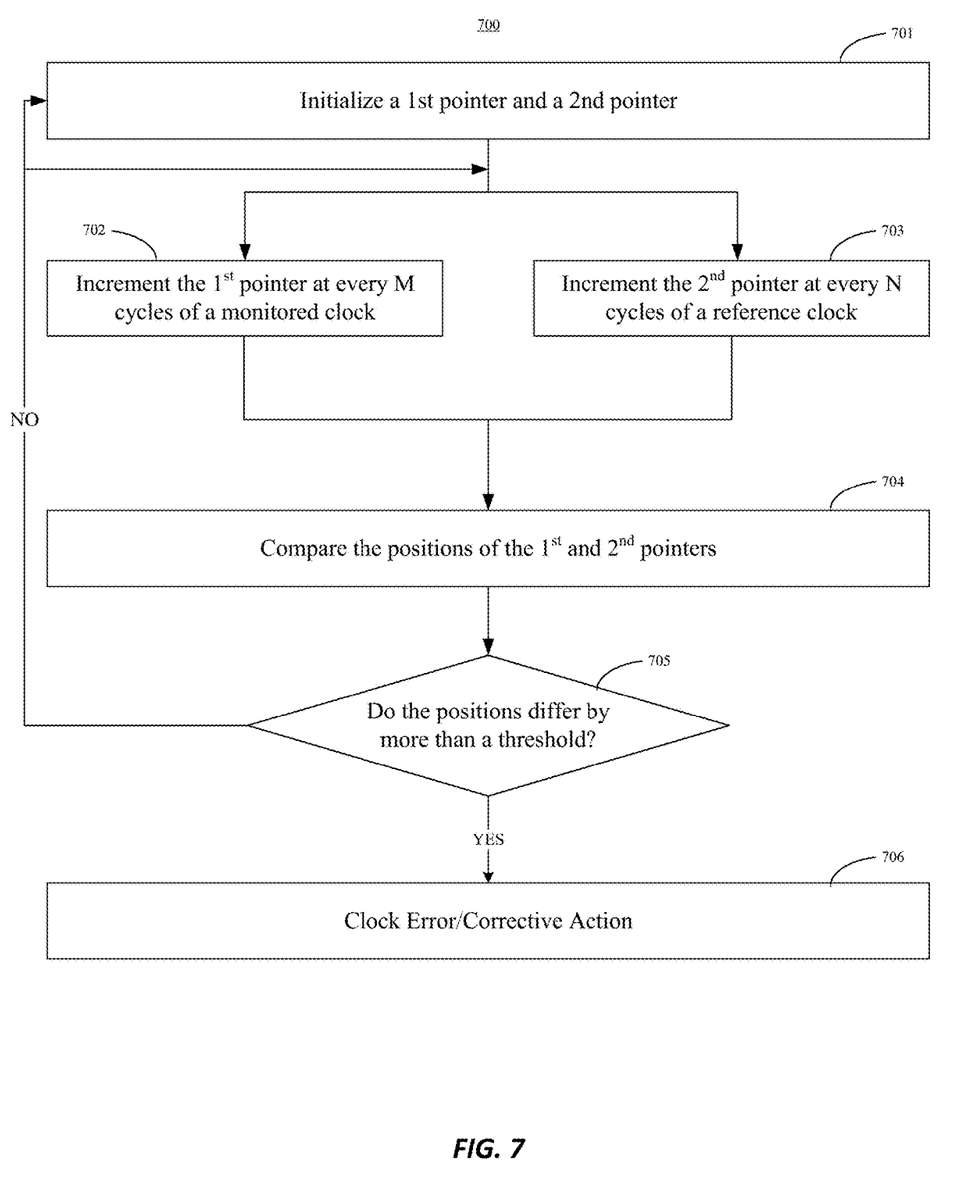
FIG. 7 is a flow diagram illustrating a method for mitigating clock failure according to implementations of the subject matter of this disclosure.

FIG. 7 is a flow diagram illustrating a method 700 for mitigating clock failure according to implementations of the subject matter of this disclosure. Method 700 of FIG. 7 may be implemented by node 600 of FIG. 6.

At 701, a first pointer and second pointer are initialized. At 702, the first pointer is incremented at every M cycles of the monitored clock. At 703, the second pointer is incremented at every N cycles of the reference clock. The initialization of 701 and incrementing of 702 and 703 may be performed by clock divergence detection circuitry 605 of FIG. 6.

At 704, the positions of the first and second pointers are compared. The comparison of 704 may be performed by comparison circuitry 607 of FIG. 6. At 705, if the positions of the pointers are determined to differ by more than a drift threshold, the node may generate a clock error and take corrective action at 706. The corrective action may be performed by error generation circuitry 608 of FIG. 6. In some implementations, the comparison of the position of the first pointer and the second pointer may be used to determine an amount of clock drift, which may then be indicated with the generated clock error.

At 705, if the positions of the pointers are determined to not differ by more than a drift threshold, the node may either continue to increment the pointers at 702 and 703 or re-initialize the pointers at 701.

Figure 8:
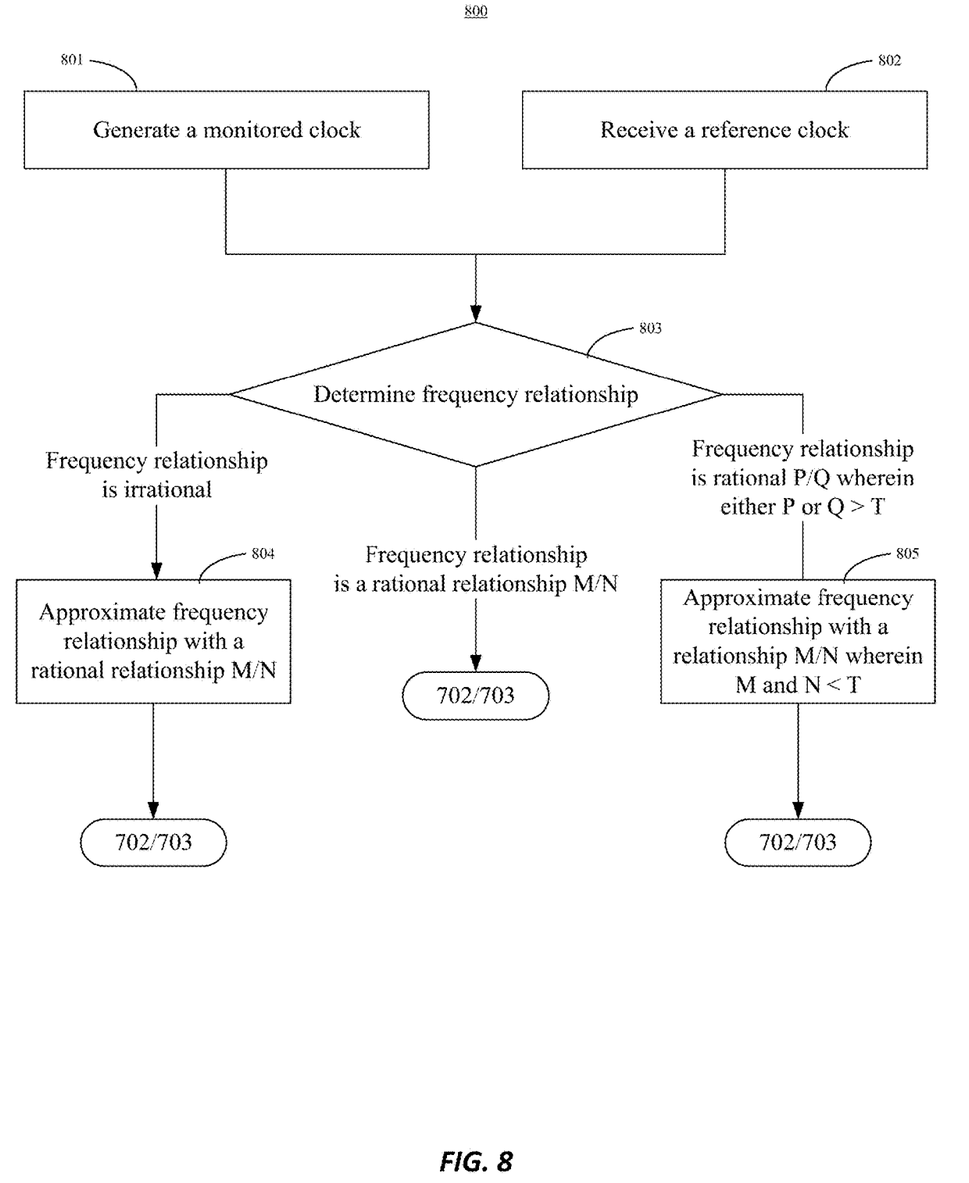
FIG. 8 is a flow diagram illustrating a method for determining a rational frequency relationship between a monitored clock and reference clock.

FIG. 8 is a flow diagram illustrating a method for determining integers M and N from the frequency relationship between a monitored clock and reference clock. Method 800 described in FIG. 8 may be implemented by node 600 of FIG. 6.

At 802, a reference clock is received. This may be reference clock 602 and may be received by input/output circuitry 604 of FIG. 6. At 801, a monitored clock is generated by the node. At 803 the frequency relationship between the monitored clock and reference clock is determined.

In some implementations, the frequency relationship is a rational relationship M/N and the node proceeds to 702 and 703 of FIG. 7 with those values for M and N.

In some implementations, the frequency relationship is an irrational relationship, as described above in the example of a relationship of π:1. Then the node proceeds to 804 and approximates the frequency relationship with a rational relationship M/N. Then, the node proceeds to 702 and 703 of FIG. 7 with those values for M and N.

In some implementations, the frequency relationship is a rational relationship P/Q with P and/or Q above a pre-set value T. These values could be used by the node for incrementing the pointers in 702 and 703, but due to the large values of P and/or Q the monitoring would take many clock cycles for the drift to be noticeable. To avoid this, a pre-set integer threshold T is set which is the maximum allowed value of either M or N. If either P or Q is greater than T, the node proceeds to 805 and approximates the frequency relationship with a relationship M/N, where both M and N are less than T. Then, the node proceeds to 702 and 703 of FIG. 7 with those values for M and N.

While various implementations of the subject matter of the present disclosure have been shown and described herein, such implementations are provided by way of example only. Numerous variations, changes, and substitutions relating to implementations described herein are applicable without departing from the subject matter of this disclosure.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for mitigating clock malfunction in an automotive network wherein a monitored clock and a reference clock have a known frequency relationship, the method comprising:

initializing a first pointer and a second pointer to initial positions;

incrementing the first pointer at every M cycles of the monitored clock and the second pointer at every N cycles of the reference clock, where M and N are integers determined by the known frequency relationship;

comparing the position of the first pointer to the position of the second pointer; and in response to determining that the position of the first pointer and the position of the second pointer differ by more than a drift threshold:
indicating a clock error; and
resetting the monitored clock.

2. The method of claim 1, further comprising determining that the known frequency relationship is a rational relationship M/N.

3. The method of claim 1, further comprising:
determining the known frequency relationship is an irrational number; and
approximating the known frequency relationship as a rational relationship M/N.

4. The method of claim 1, further comprising:
determining that the known frequency relationship is a rational fraction P/Q wherein at least one of P and Q is greater than an integer threshold; and
in response to the determining, approximating the known frequency relationship by a rational fraction M/N wherein each of M and N is less than the integer threshold.

5. The method of claim 1, further comprising:
determining that at least one of the first pointer and the second pointer has moved more than a predetermined excursion from its initial position, wherein the predetermined excursion is less than the drift threshold; and
when it is determined that at least one of the first pointer and the second pointer has moved more than the predetermined excursion from its initial position, reinitializing the first pointer and the second pointer to the corresponding initial positions.

6. The method of claim 1, further comprising, in response to comparing the position of the first pointer to the position of the second pointer, determining an amount of clock drift.

7. The method of claim 6, wherein indicating the clock error comprises indicating the amount of clock drift.

8. A node in an automotive network that generates a monitored clock, the node comprising:
input/output circuitry configured to receive a reference clock;
functional circuitry clocked by the monitored clock;
clock divergence detection circuitry configured to:
initialize a first pointer and a second pointer to corresponding initial positions;
increment the first pointer at every M cycles of the monitored clock and the second pointer at every N cycles of the reference clock, where M and N are integers determined by a known frequency relationship between the monitored clock and the reference clock;
comparison circuitry configured to compare the position of the first pointer to the position of the second pointer; and
error generation circuitry configured to, in response to determining that the position of the first pointer and the position of the second pointer differ by more than a drift threshold, generate a clock error and reset the monitored clock.

9. The node of claim 8, wherein the clock divergence detection circuitry is further configured to determine that the known frequency relationship is a rational relationship M/N.

10. The node of claim 8 wherein the clock divergence detection circuitry is further configured to:
determine the known frequency relationship is an irrational number; and
approximate the known frequency relationship as a rational relationship M/N.

11. The node of claim 8, wherein the clock divergence detection circuitry is further configured to:
determine that the known frequency relationship is a rational fraction P/Q wherein at least one of P and Q is greater than an integer threshold; and
in response to the determining, approximate the known frequency relationship by a rational fraction M/N wherein each of M and N is less than the integer threshold.

12. The node of claim 8, wherein the comparison circuitry is further configured to determine that at least one of the first pointer and the second pointer has moved more than a predetermined excursion from its initial position, wherein the predetermined excursion is less than the drift threshold; and
the clock divergence detection circuitry is further configured to, in response to determining that at least one of the first pointer and the second pointer has moved more than a predetermined excursion from its initial position, reinitialize the first pointer and the second pointer to the corresponding initial positions.

13. The node of claim 8, wherein the comparison circuitry is further configured to, in response to comparing the position of the first pointer to the second pointer, determine an amount of clock drift.

14. The node of claim 8, wherein the error generation circuitry is further configured to indicate the amount of clock drift.

15. A system in an automotive network comprising:
a reference clock source; and
a plurality of nodes, each node having:
input/output circuitry configured to receive a reference clock from the reference clock source,
functional circuitry clocked by a monitored clock,
clock divergence detection circuitry configured to:
initialize a first pointer and a second pointer to corresponding initial positions, and
increment the first pointer at every M cycles of the monitored clock and the second pointer at every N cycles of the reference clock, where M and N are integers determined by a known frequency relationship between the monitored clock and the reference clock,
comparison circuitry configured to compare the position of the first pointer to the position of the second pointer, and
error generation circuitry configured to, in response to determining that the position of the first pointer and the position of the second pointer differ by more than a drift threshold, generate a clock error and reset the monitored clock.

16. The system of claim 15, wherein the clock divergence detection circuitry is further configured to determine that the known frequency relationship is a rational relationship M/N.

17. The system of claim 15, wherein the clock divergence detection circuitry is further configured to:
determine the known frequency relationship is an irrational number; and
approximate the known frequency relationship as a rational relationship M/N.

18. The system of claim 15, wherein the clock divergence detection circuitry is further configured to:
determine that the known frequency relationship is a rational fraction P/Q wherein at least one of P and Q is greater than an integer threshold; and in response to the determining, approximate the known frequency relationship by a rational fraction M/N wherein each of M and N is less than the integer threshold.

19. The system of claim 15, wherein the comparison circuitry is further configured to determine that at least one of the first pointer and the second pointer has moved more than a predetermined excursion from its initial position, wherein the predetermined excursion is less than the drift threshold; and the clock divergence detection circuitry is further configured to, in response to determining that at least one of the first pointer and the second pointer has moved more than a predetermined excursion from its initial position, reinitialize the first pointer and the second pointer to the corresponding initial positions.

20. The system of claim 15, wherein the comparison circuitry is further configured to, in response to comparing the position of the first pointer to the second pointer, determine an amount of clock drift.

21. The system of claim 20, wherein the error generation circuitry is further configured to indicate the amount of clock drift.

\* \* \* \* \*